United States Patent [19] [11] 4,185,055
Barrilon et al. [45] Jan. 22, 1980

[54] PROCESS FOR HEAT-TREATING CARBON BLOCKS

[75] Inventors: Eric Barrilon; Michel Jarry, both of Saint Jean de Maurienne, France

[73] Assignee: Aluminum Pechiney, Paris, France

[21] Appl. No.: 733,032

[22] Filed: Oct. 18, 1976

Related U.S. Application Data

[63] Continuation of Ser. No. 523,332, Nov. 13, 1974, abandoned, which is a continuation of Ser. No. 291,788, Sep. 25, 1972, abandoned.

[30] Foreign Application Priority Data

Sep. 24, 1971 [FR] France ................. 71.34418

[51] Int. Cl.$^2$ ............................. C01B 31/02
[52] U.S. Cl. ..................... 264/29.5; 264/29.7; 264/61; 264/65; 264/71; 264/105; 264/235; 264/345; 423/445; 423/448
[58] Field of Search ............. 264/29.1, 29.5, 29.7, 264/104–105, 69, 71, 176 R, 61, 65, DIG. 19, 235, 345, DIG. 65; 423/445, 448

[56] References Cited

U.S. PATENT DOCUMENTS

| | | | |
|---|---|---|---|
| 2,699,931 | 1/1955 | Buhler et al. | 264/29.1 |
| 2,728,109 | 12/1955 | Bonnot | 264/29.1 |
| 2,799,053 | 7/1957 | Gartland | 264/29.1 |
| 2,983,022 | 5/1961 | Dressler et al. | 264/29.1 |
| 3,009,863 | 11/1961 | Angevine | 264/29.1 |
| 3,168,602 | 2/1965 | Davies et al. | 264/29.1 |
| 3,413,152 | 11/1968 | Folkins et al. | 264/105 |
| 3,560,346 | 2/1971 | Günter | 264/29.1 |
| 3,619,376 | 11/1971 | Patel et al. | 264/29.1 |
| 3,673,288 | 6/1972 | Childs | 264/25 |

FOREIGN PATENT DOCUMENTS

882920 11/1961 United Kingdom .................. 264/29.1

*Primary Examiner*—Jeffery R. Thurlow

[57] ABSTRACT

A process for heat-treating carbonaceous products such as electrodes used in the manufacture of aluminum in which the products are heated to raise the core temperature to within 120° to 170° C., heating the products to raise the core temperature to 450° C. within ten hours and without allowing the surface temperature to exceed 700° C., and then continuing to heat the products to the final calcination temperature.

10 Claims, No Drawings

PROCESS FOR HEAT-TREATING CARBON BLOCKS

This is a continuation of application Ser. No. 523,332, filed Nov. 13, 1974, now abandoned, which in turn is a continuation of application Ser. No. 291,788, filed Sept. 25, 1972, now abandoned.

This invention is concerned with the production of carbon blocks, such as electrodes used in the manufacture of aluminum.

These carbon blocks are normally produced as follows: A mixture of coke and coal tar or petroleum tar, the softening point of which is between 75° and 95° C. by the KRAEMER-SARNOW method, is molded at a temperature above the softening point of the tar, by compression, extrusion, or vibro-compression. The "green" blocks thus molded are then cooled, after which they are raised, in a heat-treating furnace, to a high temperature, usually in excess of 1000° C. This ensures, successively, the elimination of volatile materials from the tar, its coke-faction between 450° and 700° C. in the case of normal tars, and finally the calcination of the tar coke thus formed. The block thus heat-treated is then cooled and is ready for use.

For reasons of economy, it is desirable to fire the products quickly in order to reduce, furnace time, and many attempts have been made to shorten the cycle as much as possible. Unfortunately, it has been found that, if the heating rate is too high, cracks and breaks occur which make the product unserviceable (cf. British Pat. No. 882,920). This deterioration has been attributed to the fact that during cokefaction of the tar, between 450° and 700° C., there is an intense release of volatile substances, at a moment when the mechanical properties of the product are particularly low. It is therefore necessary to moderate the heating rate over this range so that the surface of the product does not exceed 700° C. before the core has reached 450° C.

However, attempts made to shorten the heating time by increasing the temperature slowly over this critical range, and more rapidly at temperatures below and above it, have not been successful industrially.

It is to be understood that acceptable heating rates depend upon the dimensions of the product. Whereas, in the case of blocks in which the smallest dimension is less than 10 cm, for example, heating rates of up to 50° C./hour and higher are acceptable, in the case of blocks such as those used in the manufacture of aluminum, the dimensions of which are 37×65×50 cm and the weight above 100 kg, the average heating rate is of the order of 15° C./hour (cf. "L'aluminium", by the engineers of the PECHINEY Group, Eyrolles—1964—T. 1, p. 174), which means that it takes 90 hours or so to raise the temperature, and one cycle therefore ties the furnace up for a week.

It is accordingly an object of the present invention to provide a process for the production of carbon blocks which overcomes the foregoing disadvantages, and it is a more specific object of the invention to provide a process for the protection of carbon blocks in which the time required to bring the blocks to the desired temperature is significantly reduced.

In the case of a "green" industrial product prepared in the conventional manner (a mixture of crushed coke and coal tar or petroleum tar having a K.S. softening point between 75° and 95° C., the proportions being between 12 and 20 kg of tar per 100 kg of the mix, molded by compression or by vibration under pressure), it has been unexpectedly found that when the temperature of the core of the product is between 120° and 170° C., it may be subjected, without danger, to extremely rapid heating. It may, for instance, be put directly into a furnace heated to 500° or 700° C. In this way, the core temperature is raised to 450° C. in only a few hours. As soon as this temperature is reached, heating may be continued, the practice requiring that the surface shall not exceed 700° C. before the core has reached 450° C. being followed.

If the product undergoes rapid heating too soon, i.e. before its core is above 120° C., in an attempt to reach the favorable zone too quickly, breaks, cracks or flaking are inevitable.

If, on the other hand, rapid heating is applied when the temperature of the core is too high, i.e. above about 170° C., deformations arising from softening of the material become unacceptable.

The method according to the invention therefore comprises bringing the temperature of the core of the product into the critical range, i.e. between 120° and 170° C., then bringing the core temperature quickly up to 450° C., within a maximum of ten hours, without allowing the surface to exceed 700° C., then continuing heating at a rate between 50° and 100° C./h to the final calcination temperature selected.

There are various ways of bringing the core temperature to between 120° and 170° C.:

For instance, the products may be cooled down to ambient temperature as usual and then reheated; or the products may be placed in a furnace heated to between 120° and 170° C. and left there until the core reaches the desired temperature; or by using a sufficiently slow reheating rate, the maximal rate varying between 6° C./h for products extruded or compression molded at 500 bars, and 30° C./h for products molded by compression at 50 bars or by vibro-compression.

The products may also be subjected, immediately after they have been molded, as usual at a temperature below 120° C., to heating which raises the core to between 120° and 170° C., for example by placing them in a furnace at a temperature above 120° C. and leaving them there for a sufficient length of time.

The core of the product may also be raised to between 120° and 170° C. during the actual molding operation, in which case the product may be placed in the heat-treating furnace immediately after the molding operation.

The choice of method depends primarily on the nature of the product. "Fat" products relatively rich in tar, bearing in mind the nature of the coke, have a great tendency to deform when stored over long periods of time. It is therefore desirable to cool them, in order to store them prior to heat-treatment. On the other hand, "lean" products may be treated without prior cooling, preferably by providing mechanical support by surrounding them with granules of coke prior to the heat treatment.

In order to bring the core of the product from a temperature between 120° and 170° C. to a temperature above 450° C. in less than 10 hours, programmed heating may be used, the heating rate being constant or varying in accordance with a specific law.

According to one preferred method especially applicable to "lean" products (which are in common use in the aluminum industry), as soon as the core temperature reaches the critical range between 120° and 170° C., the products are placed directly into a furnace previously heated to a temperature between 500° and 700° C., the leaner the product, the higher the furnace temperature.

The method has been found to be suitable for a wide range of molding processes: for instance, the compression pressure may vary between 150 and 600 bars without raising any problems. The use of vibro-compression instead of straight compression molding also presents no particular problems; on the contrary, it makes it possible to shorten furnace time.

Having described the basic concepts of the invention, referense is now made to the following examples which are provided by way of illustration, but not by way of limitation, of the practice of the invention.

EXAMPLE

Anodes measuring 40×83×50 cm were molded from a mixture of 83.4 parts by weight of crushed calcined petroleum coke of the following grain size:

| less than T4 (Tyler) | 14% |
| T4-T20 | 29% |
| T20-T200 | 34% |
| more than T200 | 23% | and 16.6 parts by weight of coal tar with a K.S. softening point of 90° C.

The hot mix was molded in a heated mold at 115° C. at a pressure of 175 bars. The "green" molded anodes were divided into six batches:

Batch 1: The control batch was treated conventionally, i.e. it was cooled in water, then heated in a furnace at an average rate of 15° C./hour, this being the rate determined by prior testing as being the maximum that could be used with no risk of breakage, to 1200° C., at which temperature it was kept for 3 hours. Cooling took 11 hours. Excluding loading and unloading, the furnace was tied up for 94 hours.

Batch 2 was cooled in water and was then placed in a furnace in which the heating rate was 5° C./h. After 30 hours, the surface of the product had reached 150° C. and the core 135° C. The products were then quickly transferred to a furnace held at 700° C. After 4 hours, when the temperature of the core had reached 450° C., the heating rate was set at 83° C./h until the temperature reached 1200° C. The furnace reached this temperature in 6 hours and was kept at this temperature for 3 hours. Cooling took 11 hours. The heating equipment, including the two furnaces, were thus tied up for a total of 54 hours (excluding loading and unloading).

Batch 3 underwent the same treatment as Batch 2, except that the products were removed from the furnace after only 20 hours, when the surfaces were at 100° C. and the cores at 85° C. (not in accordance with the invention). Upon removal from the furnace, the products had broken or cracked.

Batch 4, after being molded, was placed in a furnace at 200° C. for 2 hours, at which time the core temperature had reached 130° C. The products were then placed in a furnace at 700° C. and were given the same treatment as batch 2. In this case, the equipment was tied up for 26 hours (excluding loading and unloading). Upon removal from the furnace, the products were sound, as in the case of batches 1 and 2.

Batch 5 was placed, after molding, for 2 hours in a furnace at 100° C. (not in accordance with the invention, since the cores were at a temperature of less than 115° C.), and then in a furnace held at 700° C. in which they were subjected to the same treatment as Batch 3. Upon removal from the furnace, the products had broken or cracked.

Batch 6 was placed, immediately after molding, directly into a furnace heated to 700° C. (not in accordance with the invention, since the cores were at a temperature of 115° C.). The remainder of the treatment was as for Batches 2 and 3. The equipment was tied up for 24 hours (excluding loading and unloading). Upon removal from the furnace, most of the products were broken or cracked.

Batch 7 comprising another series of anodes was prepared from the same raw materials and under the same conditions, except that the molding temperature was 135° C. The products from this batch were placed in a furnace heated to 700° C. immediately after molding, as in the case of Batch 6, and underwent the same treatment. Upon removal from the furnace, the products were sound.

The products of batches 1, 2, 4, 6 and 7 were tested in an electrolyzing bath and gave the same good results.

By way of non-restrictive explanation, it is assumed that internal stresses arise in the products during molding and cooling and that these stresses must be relieved before the tar starts to change into coke, if beginnings of rupture are to be avoided. The critical temperature of 120° C. must be the point at which the tar is sufficiently fluid to relieve the stresses.

It will be understood that various changes and modifications can be made in the details of procedure, formulation and use, without departing from the spirit of the invention, especially as defined in the following claims.

I claim:

1. In a method for heat-treating carbonaceous products weighing more than 100 kg wherein the carbonaceous product contains from 12–20 kg of tar binder per 100 kg of coke plus binder in which the products are heated to a temperature between 900° and 1400° C. with the heating pattern being such that the surface of the product does not exceed 700° C. until the core thereof has reached 450° C., the improvement comprising heating the product until the core temperature of the product is brought to between 120° and 170° C., heating the product to raise the core temperature to beyond 450° C. in less than 10 hours, with the heating pattern being such that the surface of the product does not exceed 700° C. until the core thereof has reached 450° C., and continuing the heating of the product at a rate of 50° to 100° C. per hour until the calcination temperature within the range of 900° to 1400° C. is reached.

2. A method according to claim 1 in which when the core temperature of the product is between 120° and 170° C., the product is quickly placed in a furnace heated to a temperature between 500° and 700° C.

3. A method according to claim 1 wherein the core temperature of the product is brought to between 120° and 170° C. by heating it, after prior cooling to ambient temperature, to a temperature between 120° and 170° C. at a rate below a limit which varies between 6° C./h for a product extruded or compression-molded at 500 bars, to 30° C./h for a product compression-molded at 50 bars or molded by a vibro-compression.

4. A method according to claim 1 wherein the product is subjected to heating which brings the core temperature up to between 120° and 170° C. immediately after molding.

5. A method according to claim 1 wherein the core temperature of the product is raised to between 120° and 170° C. during the molding operation.

6. In a method for heat-treating carbon electrodes formed of from 12–20 kg of tar binder per 100 kg of binder plus coke in which the electrodes are heated to a temperature between 900° to 1400° C. with the heating pattern being such that the surface of the electrode does not exceed 700° C. until the core thereof has reached 450° C., the improvement comprising heating the electrode until the core temperature of the electrode is brought to between 120° and 170° C., heating the electrode to raise the core temperature to beyond 450° C. in less than 10 hours, with the heating pattern being such that the surface of the electrode does not exceed 700° C. until the core has reached 450° C., and continuing the heating of the electrode at a rate of 50° to 100° C. per hour until the calcination temperature within the range of 900° to 1400° C. is reached.

7. In a method for heat-treating carbonaceous products weighing more than 100 kg formed of from 12–20 kg of tar binder per 100 kg of binder plus coke in which the products are heated to a temperature between 900° and 1400° C. with the heating pattern being such that the surface of the product does not exceed 700° C. until the core thereof has reached 450° C., the improvement comprising placing the product in a furnace heated to a temperature between 120° and 170° C. for a time sufficient to heat the core of the product to a temperature within 120° to 170° C., heating the product to raise the core temperature to beyond 450° C. in less than 10 hours, with the heating pattern being such that the surface of the product does not exceed 700° C. until the core thereof has reached 450° C., and continuing the heating of the product at rate of 50° to 100° per hour until the calcination temperature within the range of 900° to 1400° C. is reached.

8. A method as defined in claim 7 wherein the product is heated to a temperature between 120° and 170° C. at a rate ranging from 6° C. per hour to 30° C. per hour.

9. A method as defined in claim 7 wherein the products, at a temperature below 120° C., are heated after molding.

10. A method as defined in claim 7 wherein the product is heated to raise the core temperature to a temperature within the range of 120° to 170° C. during molding of the product.

* * * * *